United States Patent [19]
Durbin

[11] Patent Number: 5,117,802
[45] Date of Patent: Jun. 2, 1992

[54] DUAL FUEL SYSTEM FOR COMBUSTION ENGINES

[76] Inventor: Enoch J. Durbin, 246 Western Way, Princeton, N.J. 08540

[21] Appl. No.: 683,707

[22] Filed: Apr. 11, 1991

[51] Int. Cl.⁵ .............................................. F02B 7/00
[52] U.S. Cl. .............................. 123/577; 123/27 GE; 123/1 A
[58] Field of Search ................ 123/577, 27 GE, 1 A, 123/527, 438, 576

[56] References Cited

U.S. PATENT DOCUMENTS

| | | | |
|---|---|---|---|
| 4,505,249 | 3/1985 | Young | 123/527 |
| 4,520,766 | 6/1985 | Akeroyd | 123/27 GE |
| 4,574,763 | 3/1986 | Hallberg | 123/527 |
| 4,651,699 | 3/1987 | Ohtaki et al. | 123/438 |
| 4,876,988 | 10/1989 | Paul et al. | 123/1 A |
| 4,955,326 | 9/1990 | Helmich | 123/27 GE |
| 5,010,868 | 4/1991 | Clements | 123/527 |

Primary Examiner—Raymond A. Nelli
Attorney, Agent, or Firm—Venable, Baetjer and Howard

[57] ABSTRACT

A system is described that extends the driving range provided in prior art by compressed gas fuel systems and that thereby reduces the need for bi-fuel operating capability in most applications. The system can typically more than double the energy density of a compressed gas fuel storage system. The system includes apparatus for metering the fuel supplied to the engine to minimize noxious emissions.

13 Claims, 3 Drawing Sheets

DUAL FUEL SYSTEM FOR COMBUSTION ENGINES

BACKGROUND OF THE INVENTION

Fuels which are gaseous at normal temperature and pressure, such as hydrogen methane, ethane, propane, butane, and carbon monoxide, have been used as fuels for motor vehicles for at least a century. The use of such fuels has always been limited to a very small fraction of the world's motor vehicles.

Liquid fuels, that is fuels that are liquid at normal temperatures and pressures, have been the dominant motor vehicle fuels by far.

Geological estimates of the availability of fossil fuels in the earth's crust, indicate that approximately equal quantities, on an energy equivalent basis, exist for both liquid and gaseous fuels. The gaseous fuels in nature are dominantly methane. Typically over 90 percent of natural gas is composed of methane.

The domination of liquid fuels for motor vehicle use in primarily because of their high energy density on a volume basis when compared to gaseous fuels. This permits an extended driving range between refueling intervals for liquid fuels.

Gaseous fuels, especially methane and hydrogen, generally have a higher ratio of hydrogen to carbon in the molecule and hence a higher combustion energy per unit weight than liquid fuels. Methane has 116%, and hydrogen has 279% of the energy per unit weight than gasoline.

At normal temperature and pressure, the volumetric energy density of methane is about one thousandth and hydrogen is about one twenty-five hundredth that of liquid fuels.

To provide a reasonable driving range between refueling intervals, prior art storage systems have increased the energy density of gaseous fuels by several methods. In one, the gaseous fuel is cooled to a sufficiently low temperature so that the gas liquefies. When the gaseous fuel is methane, that temperature is at most $-165°$ C. at normal pressure. This is called cryogenic storage. The volumetric energy density is then about 89% that of gasoline. An even lower temperature of $-254°$ C. is required to liquefy hydrogen. The volumetric energy density of hydrogen, when so liquefied, is about 28% that of gasoline.

At such a low temperature, the fuel must be stored in a special, very well insulated, cryogenic dewar if it is to remain in liquid form for a reasonable time. The equipment required to liquefy, store, and then regasify such fuels is very sophisticated and requires special care on the part of those who operate such systems. For safety, it is necessary to avoid contact with the cryogenic temperatures, and also to ensure that when fuel storage systems warm up suitable precautions are taken to avoid high pressure buildup in the storage vessel. These characteristics have made cryogenic storage of gaseous fuels a rarely used gaseous fuel storage system for motor vehicles.

The second and more widely used storage system has been compression of the gaseous fuel. In order to minimize the weight of storage vessels, as compared to the weight of gaseous fuel stored therein, a pressure of approximately 200 times normal atmospheric pressure is widely employed. These systems are called compressed gas systems. When methane is the gaseous fuel, the energy density on a volumetric basis is approximately one fourth that of gasoline, the most widely used liquid fuel. Therefore, a compressed natural gas (CNG) storage system provides either approximately one fourth of the driving range of a gasoline fueled engine for the same fuel storage volume or, conversely, approximately four times the storage volume required for the same range.

One consequence of this low energy density is that most vehicles operating on gaseous fuels are usually provided with a bi-fuel capability. That is, equipment is provided to permit the engine to operate on a conventional liquid fuel such as gasoline, as well as on the gaseous fuel. This requires separate storage tanks, carburetors, and all the other necessary equipment to operate on two completely different fuels. Such operating capability is called "bi-fuel capability".

Fuels that have a critical temperature below normal temperature (20° C.) I will call "low critical temperature fuels" (LCT fuels). Examples of such fuels are methane and hydrogen. Fuels that have a critical temperature above normal temperature, I will call "high critical temperature fuels" (HCT fuels). They can be liquified at normal temperature. Examples of such fuels are ethane, propane, butane, methanol, ethanol and gasoline.

Above its critical temperature a fuel cannot be liquified at any pressure.

Because HCT fuels can be stored as liquids at modest pressures, they can achieve moderately high energy densities (megajoules/meter$^3$), and can therefore provide a reasonable driving range for a vehicle in which they are employed. Unfortunately, the availability of HCT fuels, which can also be gaseous at normal temperatures, is limited. Ethane, propane and butane represent only a small fraction of the content of natural gases recovered from the earth. These fuels are also produced as small byproducts of refinery operations. Therefore, use of such fuels as important transportation fuels must be limited.

What is provided by the present invention is a method for eliminating the need for bi-fuel capability in vehicle combustion engines when it is intended to have such combustion engines operate primarily on LCT fuels in motor vehicles, by increasing the range of the vehicle, per unit volume of storage space, by more than 2 times, thereby halving the number or volume of storage tanks required for a given range, or conversely, doubling the range between fuel refills by at least a factor of two.

The present invention can reduce or eliminate the need for bi-fuel capability to increase driving range, thus eliminating the expense and weight of a bi-fuel system, while retaining the environmentally benign advantages of gaseous fuels over the total driving cycle of the vehicle.

A BRIEF DESCRIPTION OF THE INVENTION AND ITS ADVANTAGES

In the present invention, LCT fuels, with critical temperature below normal temperature, such as methane or hydrogen, are compressed in a high storage vessel together with other fuels (HCT fuels) with critical temperature at or above normal temperature, such as propane, ethane butane, methanol, ethanol, or gasoline. When the LCT fuels are compressed together with the HCT fuels, it has been found that the LCT fuels will have a higher energy density than they would have if such HCT fuels were not present. The driving range can be more than doubled with such fuel storage systems.

Further, when the fuel vapors are drawn from such storage vessels they are comprised initially mostly of the LCT fuels, which are generally much lower in cost than the HCT fuels. Methane, the most abundant and cheapest fuel, is consumed preferentially during the operation of the combustion engine.

As the pressure in the storage vessel is reduced to a fairly low value, the concentration of methane is diminished and the vapors contain more of the HCT fuels. Thus, as the fuel is consumed in the combustion engine, the molecular composition of the fuel will vary. The present invention adjusts the fuel flow to control the air to fuel ratio, even as the fuel molecular composition changes, by sensing the composition of the engine exhaust products.

The present invention will hereinafter be called the METROPANE fueling system. To illustrate its performance, a comparison is made between the present system and a conventional bi-fuel system comprised of two fueling tanks, in which one tank (35 liter capacity) contains gasoline and the other tank (65 liter capacity) contains methane compressed to 200 atmospheres. The combined fuel storage volume is 100 liters. This bi-fuel storage system contains 1083 MJ (megajoules) of gasoline energy, and 451 MJ of methane. The total energy stored is 1534 MJ, of which only 29% low cost methane. One illustrative Metropane duel fuel system consists of 100 liter storage capacity, the same total volume as in the bi-fuel system, at 200 atmospheres. The energy stored comprises 833 MJ of methane and 707 MJ of a HCT fuel (in this case propane). The total energy stored is 1540 MJ, of which 54% is low cost methane, an 85% increase in the storage of methane. The total energy stored is equivalent to that stored in the bi-fuel system.

A second illustrative Metropane dual fuel system has the same storage capacity as the previous one. The energy stored comprises 836 MJ of methane and 765 MJ of a HCT fuel (in this case butane). The total energy stored is 1601 MJ, of which 52.2% is low cost methane, an 80% increase in the storage of methane.

Thus, the range provided is equivalent to that of a typical bi-fuel system without the use of gasoline or other crude oil derived fuels.

A BRIEF DESCRIPTION OF THE FIGURES

FIG. 1 shows a preferred embodiment of the present invention. LCT fuels are stored at an elevated pressure together with HCT fuels in a high pressure storage tank. Apparatus is provided to reduce the pressure of the fuels to approximately atmospheric pressure before they are mixed with air and then supplied to a combustion engine. The mixture ratio is adjusted by an exhaust gas sensor to accommodate fuel composition changes, when the pressure in the fuel storage system is reduced, as the fuels are consumed.

DETAILED DESCRIPTION OF THE INVENTION

Figure 1:
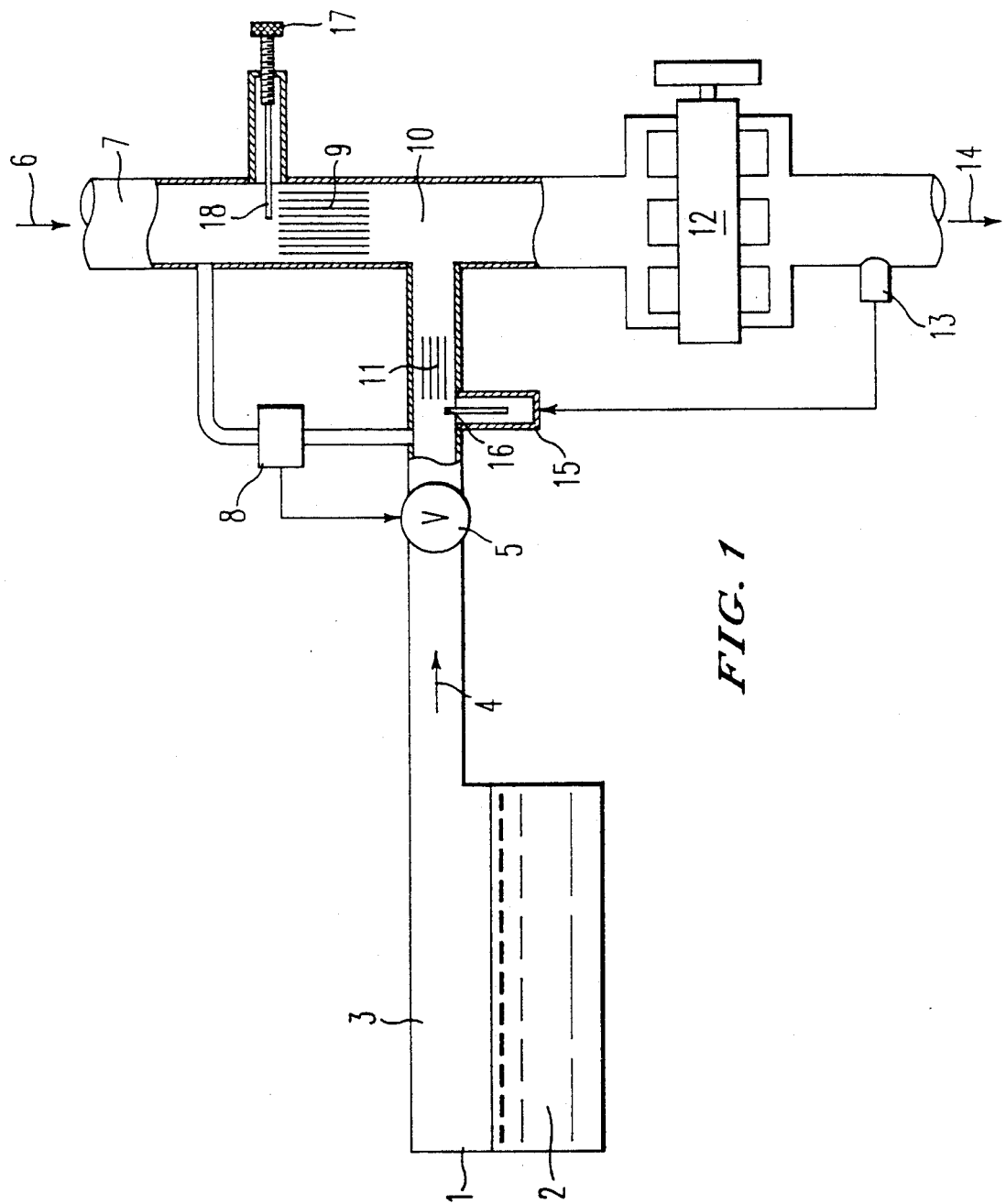

The elements of the preferred embodiment of the invention are shown in FIG. 1 A duel fuel system for a mobile combustion engine contains a fuel storage container (1) which is designed to contain fuels under high pressure, within which are two fuel storage regions. LCT fuels are dissolved in HCT fuels in one region (2), and undissolved LCT fuels and vapours of the HCT fuels are in the other region (3). Vapours of the fuels (4) in the second region (3) are drawn through a fluid pressure regulator valve (5).

Air (6), to provide a combustible mixture when mixed with said fuel vapours (4) for said mobile combustion engine, is drawn through an inlet duct (7). Differential pressure sensor means (8) senses the pressure difference between the air in the inlet duct (7) and the pressure at the outlet of pressure regulator (5). The output of the sensor (8) is used to adjust a pressure regulator valve (5) to equalize the pressure of the vapours of the fuels (4) at the outlet of the pressure regulator (5) with the pressure of the air (6) in the inlet duct (7).

The air (6) is drawn through a porous structure (9) and the fuels (4) are drawn through a porous structure (11) into a common mixing chamber (10). The pore diameters of the porous structures (11,9) are chosen to be sufficiently small so that the viscous forces in both the air (6) and fuels (4) flowing through their respective porous structures (11,9) are very much larger than the inertial forces in the fluids (say, 50 or more times larger). This is achieved typically with Reynolds numbers which are less than about 5, based on the pore diameter in the porous structure. Because of the dominance of viscous forces over inertial forces within the porous structures (9,11), the pressures in the air (6) and fuels (4) in passing through their respective porous structures (9,11) are reduced in proportion to the flow rates of the respective fluids. Since the pressure drop across the porous structures (9,11) are equal for both air (6) and fuels (4) under all flow conditions, the flow rate of the fuels (4) and air (6) into the common mixing chamber (10) will be proportionate to one another under all flow conditions.

The mobile combustion engine (12) draws in the air (6) fuel (4) mixture from the mixing chamber (10) and combusts this mixture to cause the mobile combustion engine (12) to do useful work.

A sensor (13) of the combustion products (14) in the exhaust system of said combustion engine (12) is used to signal a shutter control means (15) to adjust a shutter (16), which blocks a portion of the pass through area of the porous structure (11), thereby adjusting the ratio of proportionality of the fuels (4) and the air (6) to a predetermined ratio, to accommodate fuel composition changes when the pressure in the fuel storage system (1) is reduced as the fuel is consumed. The air shutter control means (17) is used to select the position of the shutter (18) to provide the maximum allowable pressure drop across the porous structure (9) at the maximum air flow.

Figure 2:
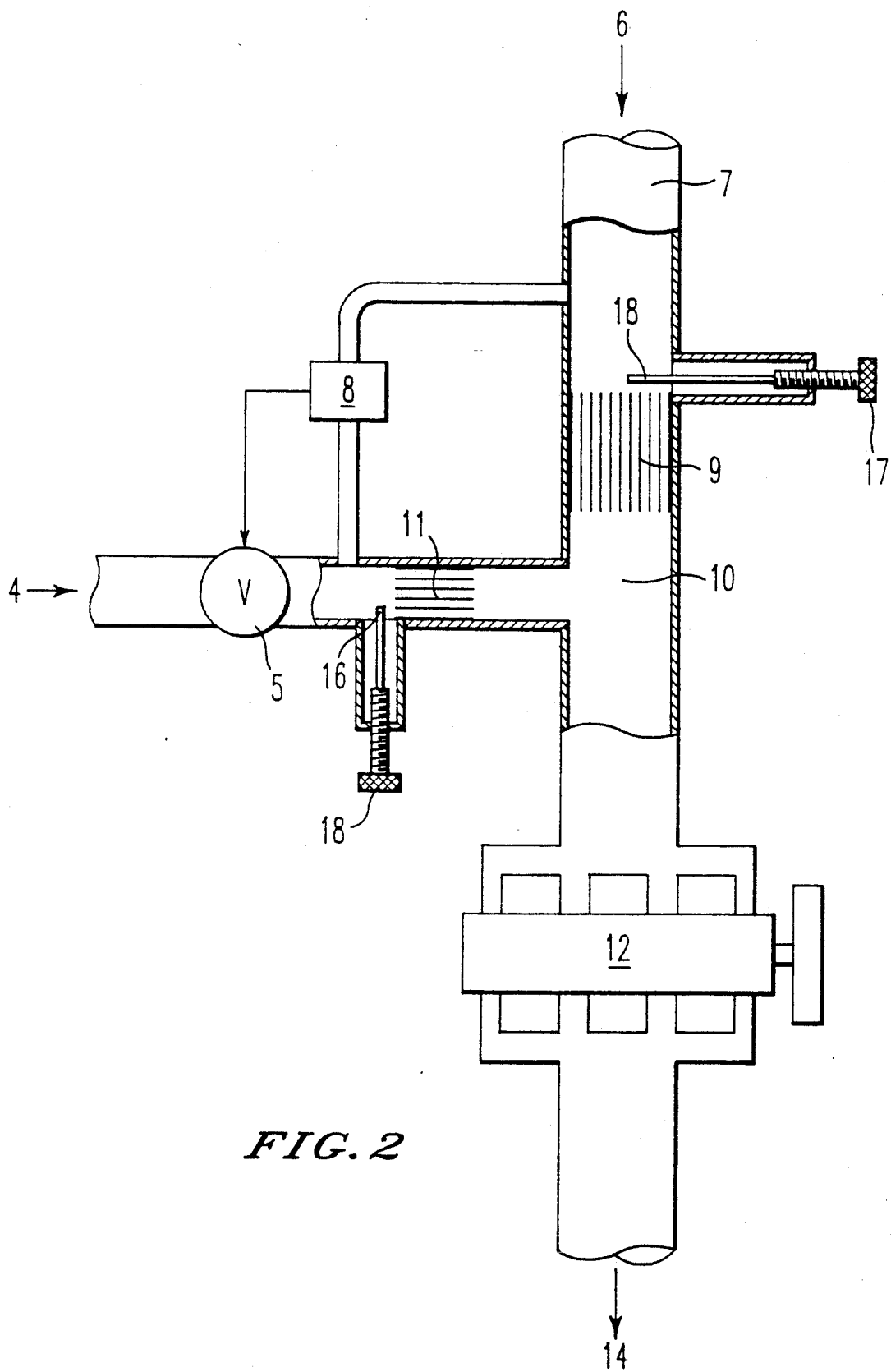
FIG. 2 shows a fragmentary embodiment of the invention in which the mixture ratio is manually adjusted when the system is installed, and no provision is made for adjustment of the mixture ratio to accommodate fuel composition changes.

FIG. 2 is a fragmentary view of the manually adjustable version of the invention. The shutter control means (15) for fuels (4) in FIG. 1 has been replaced by a manual shutter control means (18), thereby eliminating the use of the sensor (13) of the conmbustion products.

Figure 3:
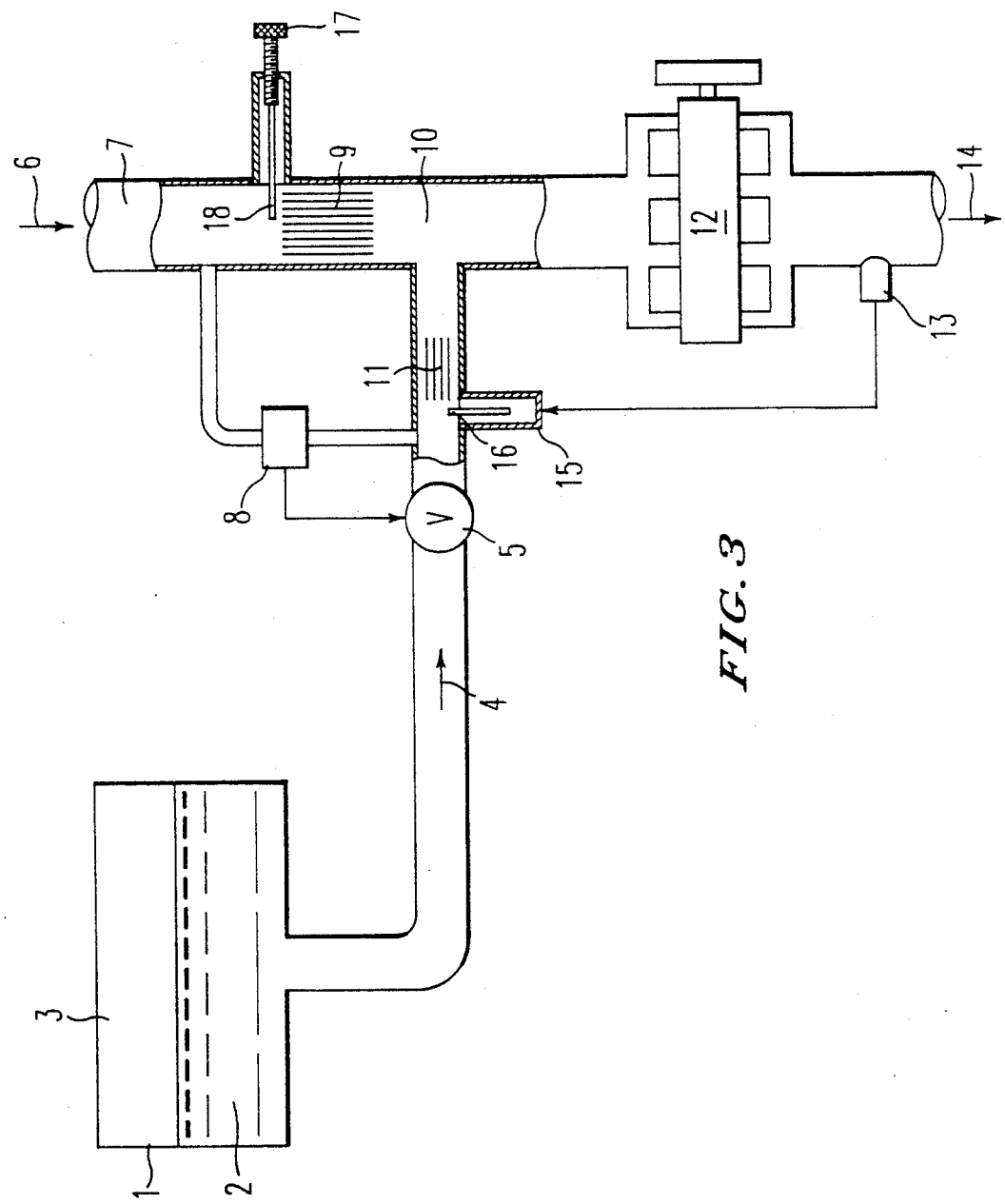
FIGS. 3 shows a fragmentary embodiment of the invention in which the fuel mixture is drawn from the high pressure storage tank from the region of the tank where LCT fuels are dissolved in HCT fuels.

In FIG. 3, the location of the duct in which the fuels (4) flow from the high pressure storage tank (1) to the pressure regulating valve (5) has been moved so that the fuels (4) flow primarily from said region (2) in said high pressure storage tank (1) toward the pressure regulating valve (5).

I claim:

1. A dual fuel storage system, which comprises at least two fuels in a common pressurized container, wherein at least one of said fuels has a critical temperature below 20° centigrade hereafter referred to as a low critical temperature fuel (LCT), and wherein at least one of said fuels in said duel fuel system has a critical temperature at or above 20° centigrade hereafter referred to as high critical temperature fuel (HCT) such that a portion of said LCT fuel is dissolved in the second of said fuels.

2. Apparatus as in claim 1 wherein said LCT fuel is methane or hydrogen.

3. Apparatus as in claim 1 wherein said HCT fuel is ethane, propane, butane, gasoline, methanol, or ethanol.

4. Apparatus as in claim 1 wherein said dual fuel storage system stores fuels for use with a combustion engine.

5. Apparatus as in claim 4 further comprising means for metering said dual fuels as they are drawn from said pressurized container into said combustion engine.

6. Apparatus as in claim 5 wherein said means for metering said dual fuels comprises pressure regulator means, and fuel flow control means.

7. Apparatus as in claim 6 wherein said fuel flow control means comprises means for metering said fuel to said combustion engine in controlled chemical proportionality with the air ingested by said combustion engine.

8. Apparatus as in claim 7 further comprising sensor means for sensing the exhaust products of said combustion engine.

9. Apparatus as in claim 8 wherein said sensor means are oxygen sensor means.

10. Apparatus as in claim 8 wherein said sensor means provide a signal for adjusting said means for metering fuel to said combustion engine.

11. Apparatus as in claim 7 wherein said fuel metering means comprise porous structure means, with pore diameter sufficiently small so that viscous forces in the fuels flowing through said porous structure are larger—say, 50 times larger—than the inertial forces in said fuels over the desired range of such fuel flows, further comprising a second porous structure means with pore diameter sufficiently small so that viscous forces in the air flowing through said second porous structure are larger—say, 50 times larger—than the inertial forces in said air over the desired range of such air flows.

12. Apparatus as in claim 5 wherein said dual fuels are drawn from the region in said pressurized container wherein said LCT fuels and HCT fuels are primarily in a gaseous state in said pressurized container.

13. Apparatus as in claim 5 wherein said dual fuels are drawn from the region in said pressurized container wherein said LCT fuels and HCT fuels are primarily in a liquid state in said pressurized container.

* * * * *